(12) United States Patent
Koike-Akino

(10) Patent No.: US 8,451,930 B2
(45) Date of Patent: May 28, 2013

(54) SPARSE CHANNEL ESTIMATION USING ORDER EXTENSION FOR FREQUENCY AND TIME SELECTIVE MIMO WIRELESS COMMUNICATION NETWORKS

(75) Inventor: Toshiaki Koike-Akino, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 317 days.

(21) Appl. No.: 13/023,231

(22) Filed: Feb. 8, 2011

(65) Prior Publication Data

US 2012/0201320 A1 Aug. 9, 2012

(51) Int. Cl.
*H04L 1/02* (2006.01)
*H04B 7/02* (2006.01)

(52) U.S. Cl.
USPC ............ 375/267; 375/299; 375/347; 375/349

(58) Field of Classification Search
USPC .......... 370/200–546; 375/130–240, 241–377; 455/1–899
See application file for complete search history.

(56) References Cited

U.S. PATENT DOCUMENTS

| | | | | |
|---|---|---|---|---|
| 6,563,880 B1* | 5/2003 | Hunsinger et al. | ............ | 375/260 |
| 7,092,457 B1* | 8/2006 | Chugg et al. | .................. | 375/324 |
| 7,480,340 B2* | 1/2009 | Andrieu | ......... | 375/267 |
| 7,519,323 B2* | 4/2009 | Mohebbi | ...................... | 455/11.1 |
| 7,801,230 B2* | 9/2010 | Sung et al. | .................... | 375/260 |
| 7,801,232 B2* | 9/2010 | Sung | ............................ | 375/260 |
| 7,817,745 B2* | 10/2010 | Cioffi et al. | .................... | 375/296 |
| 7,830,976 B2* | 11/2010 | Gorokhov et al. | ............ | 375/267 |
| 8,068,562 B1* | 11/2011 | Zhang et al. | ................... | 375/324 |
| 8,073,135 B2* | 12/2011 | Rhee et al. | ...................... | 379/417 |
| 2004/0132414 A1* | 7/2004 | Sendyk et al. | .................. | 455/73 |
| 2006/0251198 A1* | 11/2006 | Ma et al. | ........................ | 375/350 |
| 2007/0155314 A1* | 7/2007 | Mohebbi | ...................... | 455/11.1 |
| 2008/0225931 A1* | 9/2008 | Proctor et al. | ................. | 375/214 |
| 2009/0232230 A1* | 9/2009 | Hung et al. | .................... | 375/260 |
| 2010/0091642 A1* | 4/2010 | Hwang | ......................... | 370/210 |
| 2011/0286498 A1* | 11/2011 | Abrishamkar et al. | ........ | 375/148 |
| 2011/0286507 A1* | 11/2011 | Yu et al. | ......................... | 375/224 |
| 2012/0082252 A1* | 4/2012 | Annavajjala et al. | .......... | 375/260 |
| 2012/0230239 A1* | 9/2012 | Park et al. | ...................... | 370/311 |
| 2012/0320783 A1* | 12/2012 | Wu et al. | ....................... | 370/252 |

OTHER PUBLICATIONS

M. Akcakaya and V. Tarokh, "Shannon theoretic limits on noisy compressive sampling," IEEE Trans. IT, vol. 56, No. 1, pp. 492-504, Jan. 2010.*
W. U. Bajwa, J. Haupt, G. Raz, and R. Nowak, "Compressed channel sensing," IEEE CISS, pp. 5-10, Mar. 2008.*

(Continued)

*Primary Examiner* — Daniel Washburn
*Assistant Examiner* — Amneet Singh
(74) *Attorney, Agent, or Firm* — Dirk Brinkman; Gene Vinokur

(57) ABSTRACT

A channel matrix is estimated for a channel subject to frequency and time selective fading in a multiple-input multiple-output (MIMO) wireless communication network. The method uses a recursive least-squares (RLS) process and an expectation-maximization (EM) process, based on a $L_1$-$L_q$ regularized sparse regression. The method significantly improves an accuracy of the channel estimation by using high-order matrix extension to obtain covariance matrices. The covariance matrices and an initial estimate are refined by a sparse EM to obtain the final estimate of the channel.

8 Claims, 6 Drawing Sheets

OTHER PUBLICATIONS

E. J. Candes and T. Tao, "Decoding by linear programming," IEEE Trans. IT, vol. 51, No. 12, pp. 4203-4215, Dec. 2005.*

E. E Candes and T. Tao, "The Dantzig selector: Statistical estimation when p is much larger than n," J. Ann. Statist., vol. 35, No. 6, pp. 2313-2351, Dec. 2007.*

Y. Chen, Y. Gu, and A. O. Hero III, "Sparse LMS for system identification," IEEE ICASSP, pp. 3125-3128, Apr. 2009.*

D. L. Donoho, "Compressed sensing," IEEE Trans. IT, vol. 52, No. 4, pp. 1289-1306, Apr. 2006.*

J. W. Choi, K. Kim, T. J. Riedl, and A. C. Singer, "Iterative estimation of sparse and doubly-selective multi-input multi-output (MIMO) channel," Asilomar Conf., pp. 620-624, Nov. 2009.*

B. Babadi, N. Kalouptsidis, and V. Tarokh, "SPARLS: The sparse RLS algorithm," IEEE Trans. SP, vol. 58, No. 8, pp. 4013-4025, Aug. 2010.*

B. Babadi, N. Kalouptsidis, and V. Tarokh, "Comparison of SPARLS and RLS algorithms for adaptive filtering," IEEE Sarnoff, pp. 1-5, Princeton, Apr. 2009.*

M. A. T. Figueiredo and R. D. Nowak, "An EM algorithm for waveletbased image restoration," IEEE Trans. Image Process., vol. 12, No. 8, pp. 906-916, Aug. 2003.*

G. B. Giannakis and C. Tepedelenlioglu, "Basis expansion models and diversity techniques for blind identification and equalization of time-varying channels," Proc. IEEE, vol. 86, No. 10, pp. 1969-1986, Oct. 1998.*

T. T K. Akino, "Optimum-weighted RLS channel estimation for rapid fading Mimo channels," IEEE Trans. Wireless Commun., vol. 7, No. 11, pp. 4248-4260, Nov. 2008.*

T. Koike-Akino and P. Orlik, "High-order super-block GLRT for non-coherent Grassmann codes in MIMO-OFDM systems," IEEE GLOBECOM, Miami, Dec. 2010.*

P. Zhao, G. Rocha, and B. Yu, "Grouped and hierarchical model selection through composite absolute penalties," J. Ann. Statist., vol. 37, No. 6A, pp. 3468-3497, 2009.*

H. Liu and J. Zhang, "On the l1-lq regularized regression," Tech. Rep. Carnegie Mellon Univ., Feb. 2008.*

J. Lin, J. G. Proakis, F. Ling, and L. A. Hanoch, "Optimal tracking of time-varying channel: A frequency domain approach for known and new algorithms," IEEE JSAC, vol. 13, pp. 141-154, Jan. 1995.*

J. A. Tropp, "Just relax: Convex programming methods for identifying sparse signals in noise," IEEE Trans. IT, vol. 51, No. 3, pp. 1030-1051, Mar. 2006.*

R. R Tibshirani, "Regression shrinkage and selection via the lasso," JSTOR J. Royal Statist. Society, Series B (Methodological), vol. 58, pp. 267- 288, 1996.*

S. S. Chen, D. L. Donoho, and M. A. Saunders, "Atomic decomposition by basis pursuit," JSTOR SIAM Review, vol. 43, No. 1, pp. 129-159, Feb. 2001.*

M. M R. Osborne, B. Presnell, and B. A. Turlach, "On the lasso and its dual," JSTOR J. Computational Graphical Statist., vol. 9, No. 2, pp. 319-337, 2000.*

\* cited by examiner

100

200

400

500

600

SPARSE CHANNEL ESTIMATION USING ORDER EXTENSION FOR FREQUENCY AND TIME SELECTIVE MIMO WIRELESS COMMUNICATION NETWORKS

FIELD OF THE INVENTION

This invention relates generally to communication networks, and more particularly to estimating channels between transceivers in wireless multiple-input multiple-output (MIMO) networks.

BACKGROUND OF THE INVENTION

Wireless communication experiences non-stationary, fast fading channel conditions, especially for transceivers that move rapidly. This makes it difficult to estimate the channel to enable coherent signal detections.

Many channel estimation methods for frequency and time selective fading are known. One of the most widely used methods performs a recursive least-square (RLS) process, which has a good tracking ability and low complexity. The tracking performance can be improved with an order extended RLS process.

While the order extended RLS process offers good estimation accuracy in a high signal-to-noise ratio (SNR) regimes and for very fast fading channels, the estimation capability is severely degraded when the channel is slow fading, sparse in frequency, and very noisy.

For sparse channel estimations, a sparse RLS process, which uses compressive sensing based on $L_1$-norm regularization, is known. Compressive sensing determines sparse solutions for under-determined linear systems. However, that method assumes a single-antenna at the transceiver. In addition, the performance degrades in a very rapid fading channel because that method is based on conventional zero-order channel estimation.

SUMMARY OF THE INVENTION

The embodiments of the invention provide a method for estimating a channel in a frequency and time selective multiple-input multiple-output (MIMO) network, wherein transceivers have multiple antennas. The method estimates a rapid time-varying channel with channel sparseness in the time domain.

The invention solves the following three problems that are characteristic of prior art channel estimation methods. The estimation accuracy is degraded for low SNR regimes when high-order estimations are used. Low-order estimation suffers from a severe performance degradation for high SNR regimes in time-varying channels. Sparse channel estimations are computationally complex.

DETAILED DESCRIPTION OF THE PREFERRED EMBODIMENTS

Figure 1:
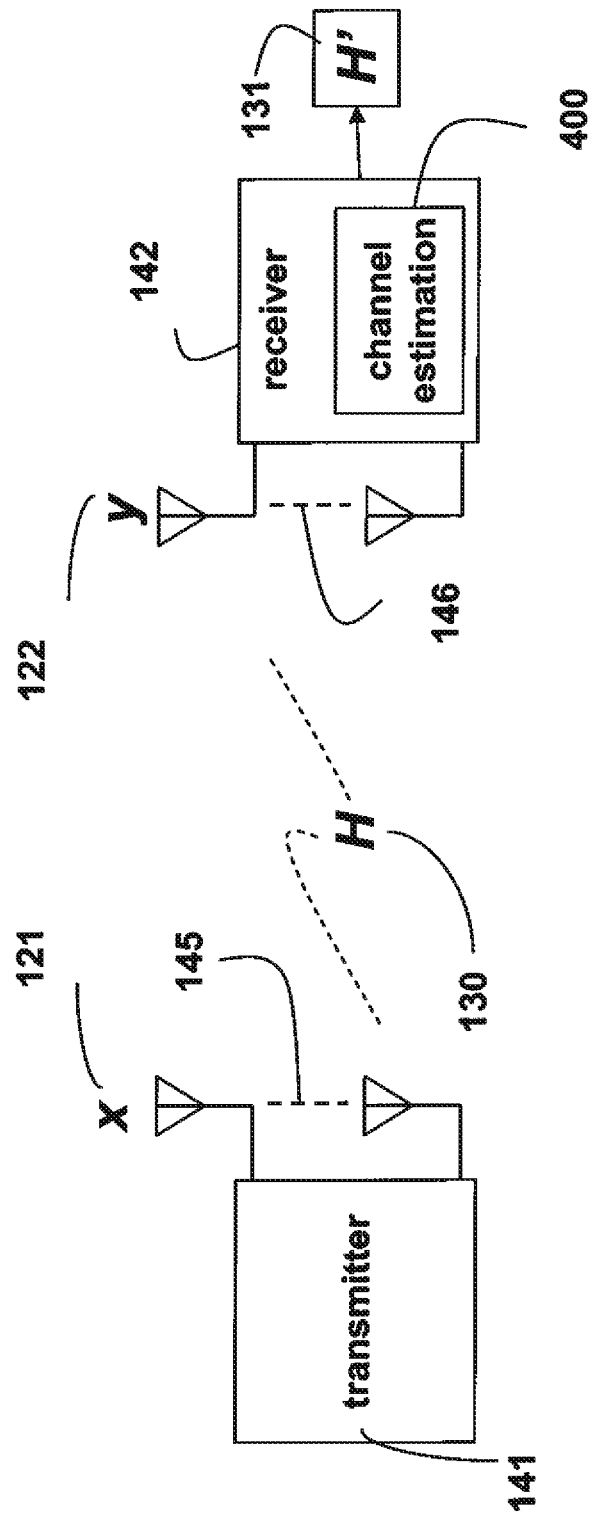
FIG. 1 is a block diagram of a multiple-input multiple-output (MIMO) wireless communication network according to embodiments of the invention.

As shown in FIG. 1, the embodiments of the invention provide a method 400 for estimating a channel 130 in a frequency and time selective multiple-input multiple-output (MIMO) network 100. The network includes at least two transceivers. The first transceiver can operate as a transmitter 141, while the transceiver operates as a receiver 142, or vice versa. The steps of the method 400 operate in a processor at the receiver. The processor is connected to memory and input/output interfaces.

The transmitter includes a set of transmit antennas 145, and the receiver includes a set of receive antennas 146. Let M and N be the number of transmit antennas and that of receive antennas, e.g., two each, M=N=2. An M-dimensional vector signal x 121 is transmitted by the antennas at the transmitter. The corresponding received signal 122 at the receiver, after passing through the channel 130, is y, which is an N-dimensional vector. The channel can be represented by a matrix H. At the receiver, an estimated version of the channel matrix H' 131 is obtained by the steps of the estimation method 400.

Figure 2:
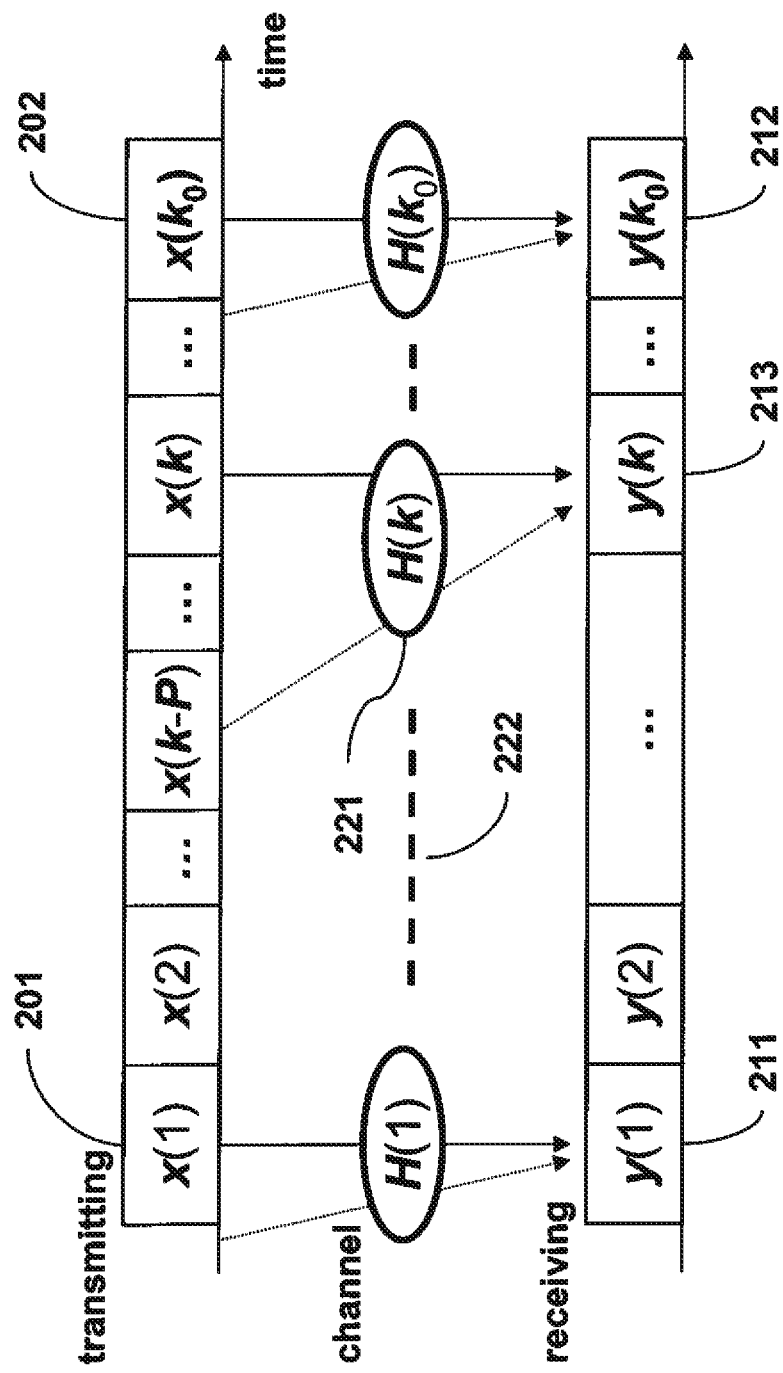
FIG. 2 is a time diagram of wireless transmission for channel estimation according to embodiments of the invention.

FIG. 2 shows a detailed time diagram of the signal transmission x 121 from the transmitter to the receiver for the channel estimation. The transmitter sends a transmitting sequence $x(1)$ 201 through $x(k_0)$ 202, where $k_0$ denotes a length of the packet sequence in symbols. The receiver obtains the corresponding sequence from $y(1)$ 211 to $y(k_0)$ 212. The frequency-selective fading channel has a memory incurring inter-symbol interference. Let P be a maximum channel memory length. At the $k^{th}$ symbol, the received signal $y(k)$ 213 is expressed by a mixture of the previous P+1 symbols through the frequency-selective fading channel H(k) 221 as follows:

$$y(k) = \sum_{p=0}^{P} H_p(k)x(k-p) + z(k)$$
$$= H(k)x'(k) + z(k),$$

where $H_p(k)$ is the $p^{th}$ delayed-tap channel matrix of size N×M, z(k) is the receiver noise of size N by 1, H(k) is the compound channel matrix of size N×M(P+1), and x'(k) is the compound transmit signal, which stacks the previous P+1 symbols. The channel rapidly changes in time 222. Hence, the channel is termed a frequency-and-time selective channel.

Figure 3:
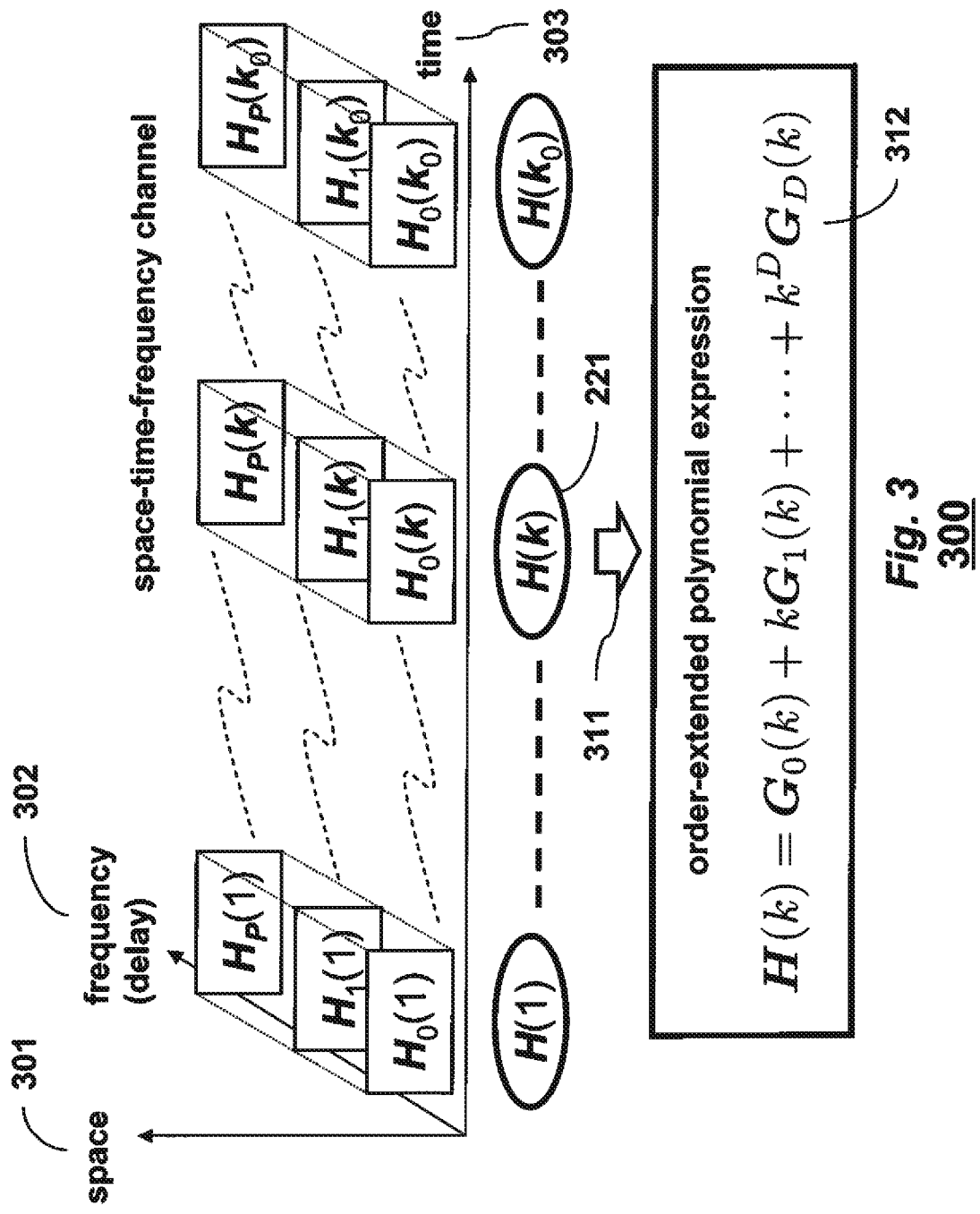
FIG. 3 is a schematic of a frequency-and-time selective fading MIMO channel with order-extended polynomial expression according to embodiments of the invention.

FIG. 3 shows the time variation of the MIMO channel, H(k) 221, in symbol time index k. For most typical radio channels, there are only a few non-zero entries in the channel matrix H(k) 221 and many zero or near zero values, and the Doppler frequency that causes time variation is bounded by the maximum Doppler frequency. This implies that the channel H(k) 221, which spans in space dimension 301, in frequency (or, delay domain) dimension 302, and in time dimension 303, becomes very sparse.

Sparsity: In the field of numerical analysis, a sparse matrix is a matrix populated primarily with many zero or near zero values.

The method 400 estimates an optimal frequency-and-time selective channel matrix H(k), using the high-order sparse regressions for such a sparse channel matrix.

Introducing the Taylor-series expansion, the time-varying channel matrix can be expressed by high-order polynomial 311 as follows:

$$H(k) = G_0(k) + kG_1(k) + \ldots + k^D G_D(k)$$
$$= \sum_{d=0}^{D} k^D G_d(k)$$
$$= G(k)D'(k),$$

where $G_d(k)$ 312 is the $d^{th}$ order polynomial term of size N×M(P+1), D is a maximum polynomial order under consideration, G(k) is an N×M(P+1)(D+1) dimensional matrix which stacks $G_0(k)$, $G_1(k)$, and $G_D(k)$, and D'(k) is an order extension matrix of size M(P+1)(D+1)×M(P+1). This order-extended polynomial expression reduces the effective fading speed by considering a new channel matrix G(k), rather than the original channel matrix H(k) because the major time variation is absorbed by the order extension matrix D'(k). Moreover, the new channel matrix G(k) is sparser than the channel matrix H(k) because of an additional order dimension. Note that the use of another order extension, such as Fourier-series expansion, provides an alternative embodiment of the invention.

Figure 4:
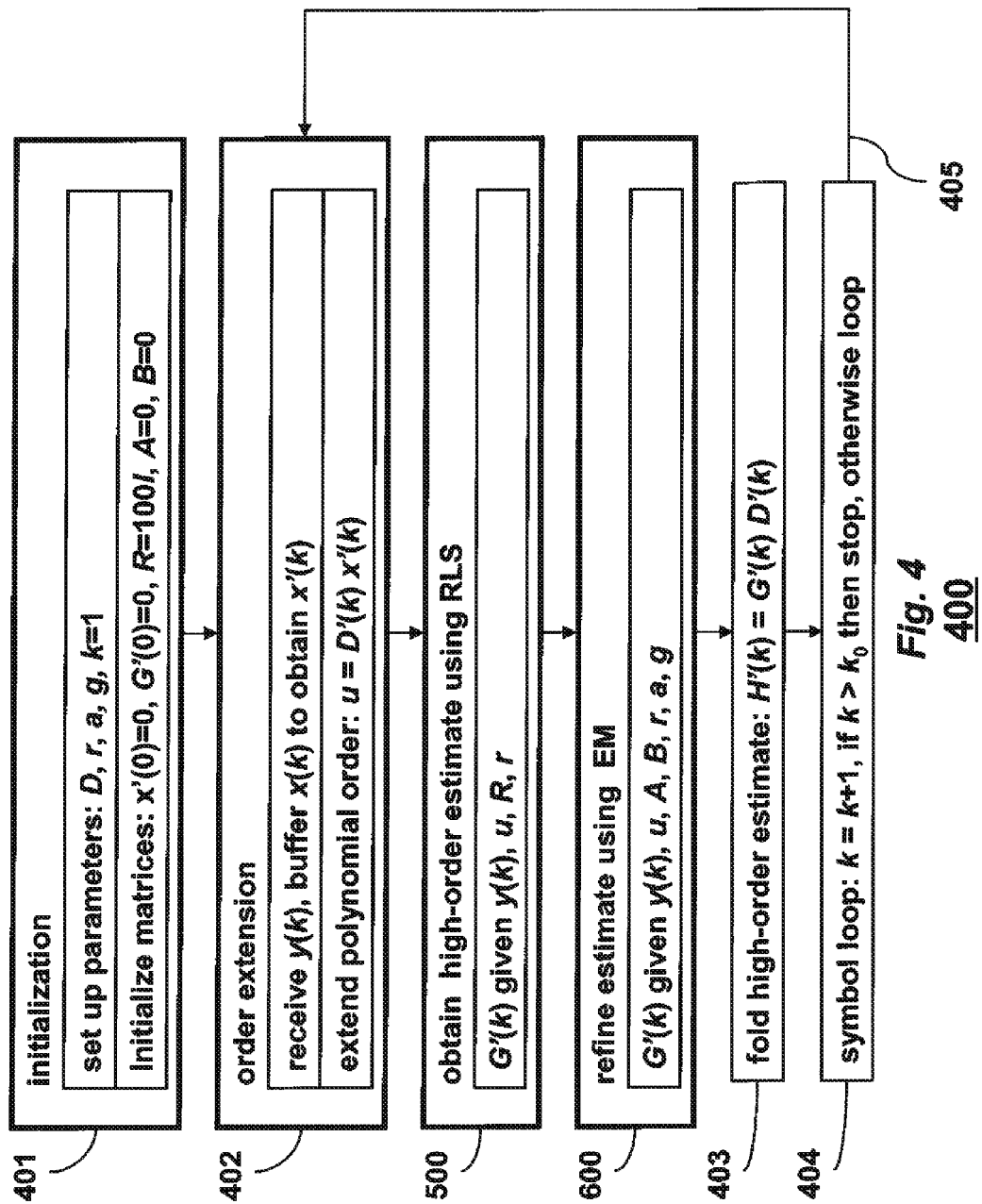
FIG. 4 is a block diagram of the high-order sparse MIMO channel estimation method employing an order-extended recursive least-squares (RLS) procedure, and an expectation-maximization (EM) procedure according to embodiments of the invention.

FIG. 4 shows the details of the high-order sparse MIMO channel estimation method 400, which employs the order-extended recursive least-squares (RLS) procedure 500 and the expectation-maximization (EM) procedure 600 for low-complexity process at the receiver 142. The steps of the method include six major blocks: initialization 401, order extension 402, RLS 400, EM 500, order folding 403, and loop control 404.

At the initialization step 401, some parameters (polynomial order D, forgetting factor r, an EM constant a, and sparseness control factor g) used in the RLS procedure 500 and EM procedure 600 are set initialized, e.g., D=2, r=0.98. The values of a and g are adjusted by the channel signal-to-noise ratio (SNR), more specifically is exponentially decreasing with SNR, and g is linearly increasing with SNR. The initialization step 401 also sets up some matrices (transmit signal memory x'(0)=0, an order-extended channel G'(0)=0, a signal correlation matrix R, EM correlation matrices A=0 and B=0) required for RLS and EM procedures. The correlation matrix R is initialized as R=cI with large constant c and identity matrix I, e.g. R=100I. The symbol index is initialized as k=1.

At the order extension step 402, the receiver obtains the received signal y(k) and the transmitted signal x(k). The transmitted signal x(k) is a packet including a training sequence and a data sequence. The training sequence is known at the receiver during a channel training period (typically in the first several symbols (preamble) of the packet), while x(k) is given by a decision through decoding process at the receiver during the data transmission period. The transmitted signal x(k) is buffered in a M(P+1)-dimensional memory as x'(k). The buffered signal x'(k) is extended to $D^{th}$ order polynomial signal u=D'(k)x'(k) of size M(P+1)(D+1).

In the RLS procedure 500, the least-squares solution of the high-order channel matrix G'(k), is recursively obtained given y(k), u, R, and r. The RLS procedure is used to accelerate the convergence speed of the following EM procedure. It is possible to exclude the RLS step by duplicating as G'(k)=G'(k−1). In the EM step procedure, the estimate G'(k) is iteratively refined to take advantage of channel sparseness through the expectation and maximization procedures, given y(k), u, r, a, g, A, and B.

After the convergence in the EM procedure, the order folding step 403 obtains the optimal channel estimation matrix H'(k) from the order-extended channel G'(k), as G'(k)D'(k). In the loop control step 404, the symbol index k is incremented and the steps from the order extension 402 are iterated until k reaches the end of the sequence $k_0$ 405.

Figure 5:
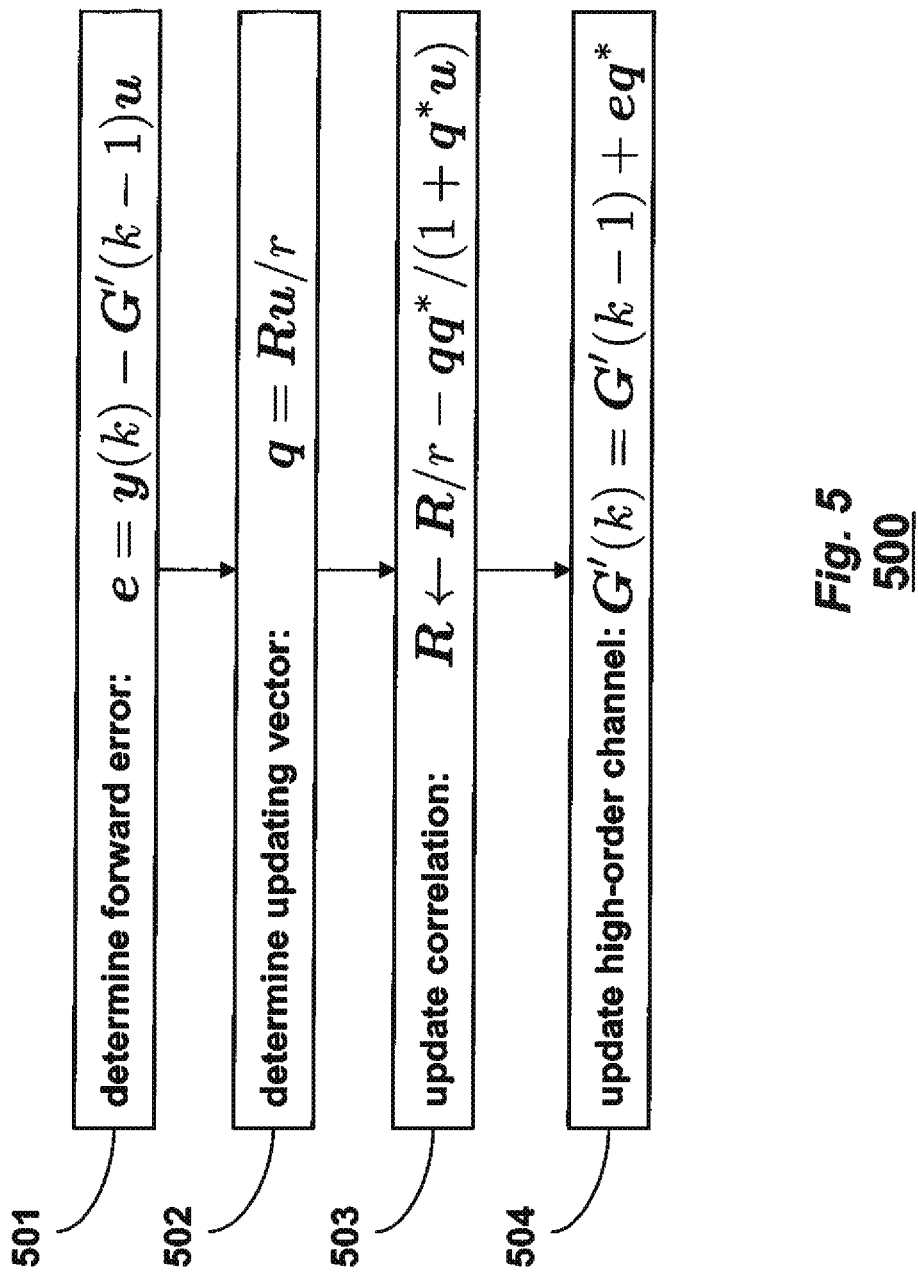
FIG. 5 is a block diagram of the order-extended RLS procedure for estimating the time-varying channel according to embodiments of the invention.

FIG. 5 shows the high-order RLS procedure 500. Given initialized parameters (r and R) 401 and order-extended signal u 402, the least-squares estimate is recursively obtained by the following four steps: determining a forward error vector 501, determining an update vector 502, updating a correlation matrix R 503, and updating the order-extended channel matrix 504.

First, the forward error vector e of size N is determined by subtracting an expected received replica G'(k−1) u from the received signal y(k) as follows:

$$e=y(k)-G'(k-1)u,$$

where the error vector e is used as a gradient descent to minimize the mean-square error. Next, the updating vector q of size M(P+1)(D+1) is determined as follows:

$$q=Ru/r,$$

which is used as a step size of the gradient descent. The correlation matrix R is then updated as $$R \leftarrow R/r-qq^*/(1+q^*u),$$

where the super-script [.]* denotes the Hermitian transpose of a matrix. This updated correlation matrix is used at the next symbol to generate a new updating vector q. Finally, the order-extended channel matrix G'(k) is obtained from the previous value G'(k−1) and the gradient vectors e and q as follows:

$$G'(k)=G'(k-1)+eq^*.$$

This high-order RLS method obtains the optimal estimate, which minimizes the mean-square error, using high-order polynomial regressions. However, it does not consider the sparseness underlying in the high-order channel matrix. The channel matrix is further refined by the sparse EM procedure 600.

Figure 6:
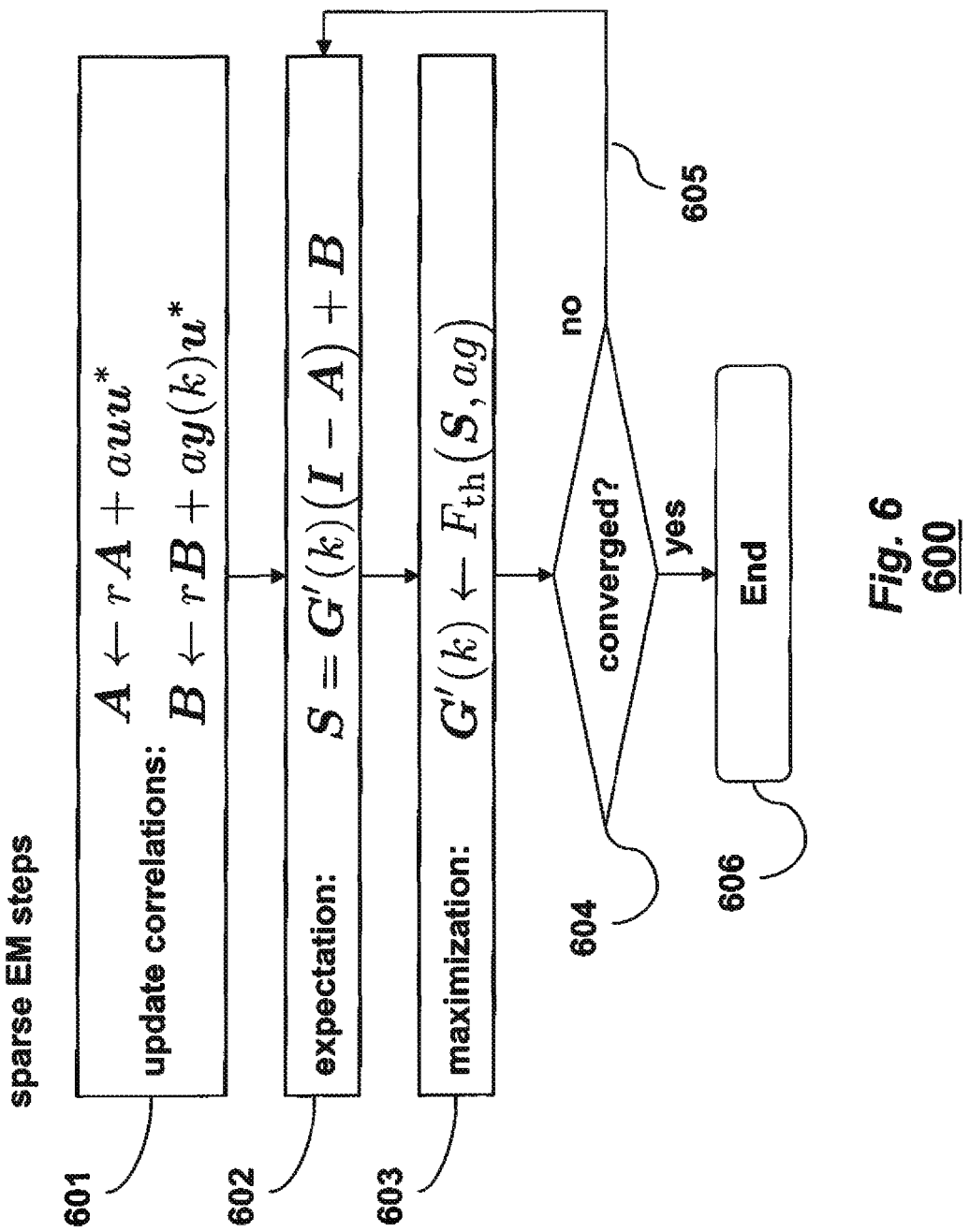
FIG. 6 is a block diagram of a sparse EM procedure according to embodiments of the invention.

FIG. 6 shows the steps of the sparse EM procedure. At the first step 601, an auto-correlation matrix A and a cross-correlation matrix B are updated, given u and y(k) with predetermined constants a and r, as follows:

$$A \leftarrow rA+auu^*$$

$$B \leftarrow rB+ay(k)u^*.$$

At the second step 602, the high-order channel matrix G(k) is expected to obtain an expectation value S by considering the matrix sparseness as follows $$S=G'(k)(I-A)+B.$$

Given the expectation S, the high-order channel matrix G(k) is refined to maximize a likelihood for sparse matrices at the maximization step 603, as follows:

$$G'(k) \leftarrow F_{th}(S,ag),$$

where g is a sparseness control factor, which is initialized at the step 401, and $F_{th}(.)$ is a soft-threshold function defined as $$F_{th}(x, b) = x\max\left(0, 1 - \frac{b}{2|x|}\right),$$

with |.| being the magnitude of a complex number. If the high-order channel matrix G'(k) is not sufficiently converged 604, the expectation step 602 and the maximization step 603 are iterated 605 until the convergence. Otherwise, the EM step ends, and the optimal sparse channel estimation G'(k) is obtained.

EFFECT OF THE INVENTION

Compared to the conventional channel estimation methods, the invention has the following advantages.

The method does not require pre-estimation to determine non-zero tap positions.

The method automatically controls the optimal order, the optimal tap gains, and the optimal tap for time-varying MIMO channels.

The method provides near-optimal performance for any channel conditions over the whole SNR regimes, any dense-or-sparse channels, and channel changing speed, whereas the conventional method has a poor performance particularly for high SNR regimes and dense channels.

The method can be applied to other networks including wired communications, fiber-optics communications, and control networks which can be modeled by frequency-and-time selective MIMO tapped delay line. Here, MIMO includes any single-antenna scenarios as well as multiple-antenna cases.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

I claim:

1. A method for estimating a channel matrix for a channel between a transmitter and a receiver in a wireless multiple-input multiple-output (MIMO) network, wherein the receiver includes a set of M transmit antennas, and the receiver includes a set of N receive antennas, comprising the steps of:

buffering k symbols of a transmitted signal x(k) as a buffered signal x'(k);

extending the buffered signal to a $D^{th}$ order polynomial signal u=D'(k)x'(k) of size M(P+1)(D+1), wherein D is a maximum polynomial order, D'(k) is an order extension matrix, P is a maximum length of a channel memory of k symbols;

obtaining an estimate of an order-extended channel matrix G'(k) using an order extended recursive least-squares (RLS) process, based on u, a received signal y(k) corresponding to the transmitted signal x(k), and a signal correlation matrix R;

refining the estimate using a sparse expectation-maximization (EM); and folding the order-extended channel matrix G'(k) to obtain an estimate of a channel matrix H'(k) as G'(k)D'(k), wherein the steps are performed in a processor of the receiver.

2. The method of claim 1, wherein the channel matrix H'(k) is optimal for fast fading and sparse channels.

3. The method of claim 1, wherein the refining further comprises:

determining correlation matrices A and B for the EM procedure using a high-order matrix recursion;

determining an expectation S=G'(k)(I−A)+B, wherein I is an identity matrix, and updating G'(k) using S until convergence.

4. The method of claim 1, wherein the obtaining further comprises:

determining a forward error vector e;

generating an update vector q; and updating the correlation matrix R to obtain the estimate of an order-extended channel matrix G'(k).

5. The method of claim 1, wherein the extended recursive least-squares (RLS) process uses high-order polynomial regressions.

6. The method of claim 1, wherein transmitted signal is a packet including a training sequence and a data sequence, and the receiver uses the training sequence and the data sequence as a channel estimation signals after decoding and a decision.

7. The method of claim 1, wherein the order extended recursive least-squares (RLS) process uses a Taylor-series expansion.

8. The method of claim 1, wherein the order extended recursive least-squares (RLS) process uses a Fourier-series expansion.

* * * * *